A. T. KASLEY.
CONVERTER.
APPLICATION FILED MAY 27, 1913.

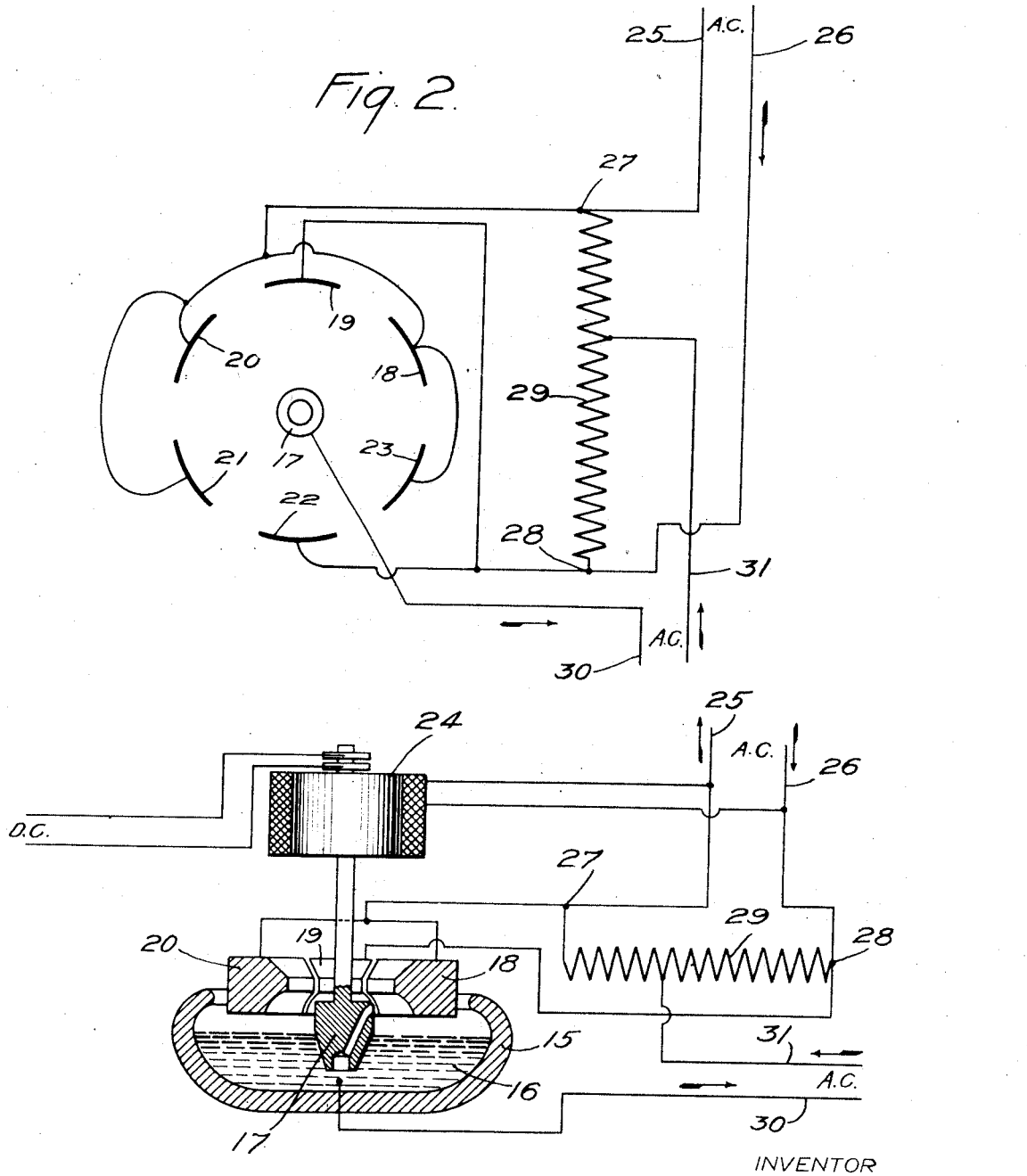

1,193,485.

Patented Aug. 1, 1916.
2 SHEETS—SHEET 2.

INVENTOR.
Alexander T. Kasley
BY
HIS ATTORNEY IN FACT.

UNITED STATES PATENT OFFICE.

ALEXANDER T. KASLEY, OF SWISSVALE, PENNSYLVANIA.

CONVERTER.

1,193,485.  Specification of Letters Patent.  Patented Aug. 1, 1916.

Original application filed September 14, 1909, Serial No. 517,606. Divided and this application filed May 27, 1913. Serial No. 770,195.

*To all whom it may concern:*

Be it known that I, ALEXANDER T. KASLEY, a citizen of the United States, and a resident of Swissvale, in the county of Allegheny and State of Pennsylvania, have made a new and useful Invention in Converters, of which the following is a specification.

This is a division of an application filed by me on or about September 14, 1909, Serial No. 517,606, for "converters" and relates more particularly to converters for converting current of one frequency to current of another frequency.

Figure 3:
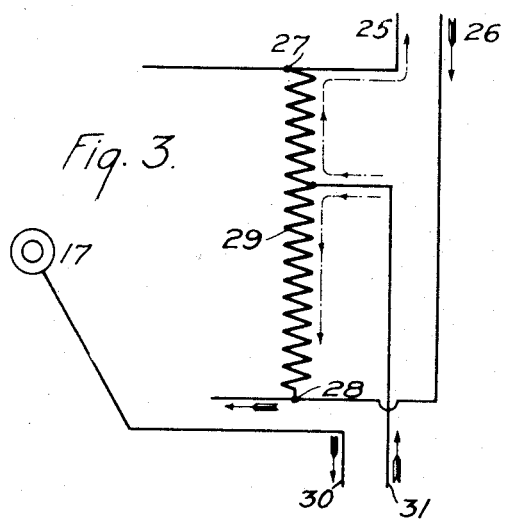
Figure 4:
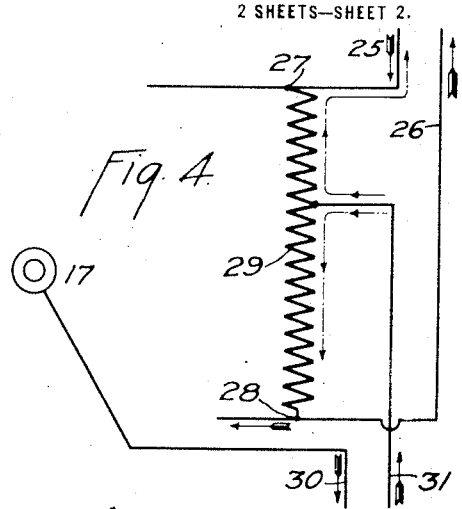
Figure 7:
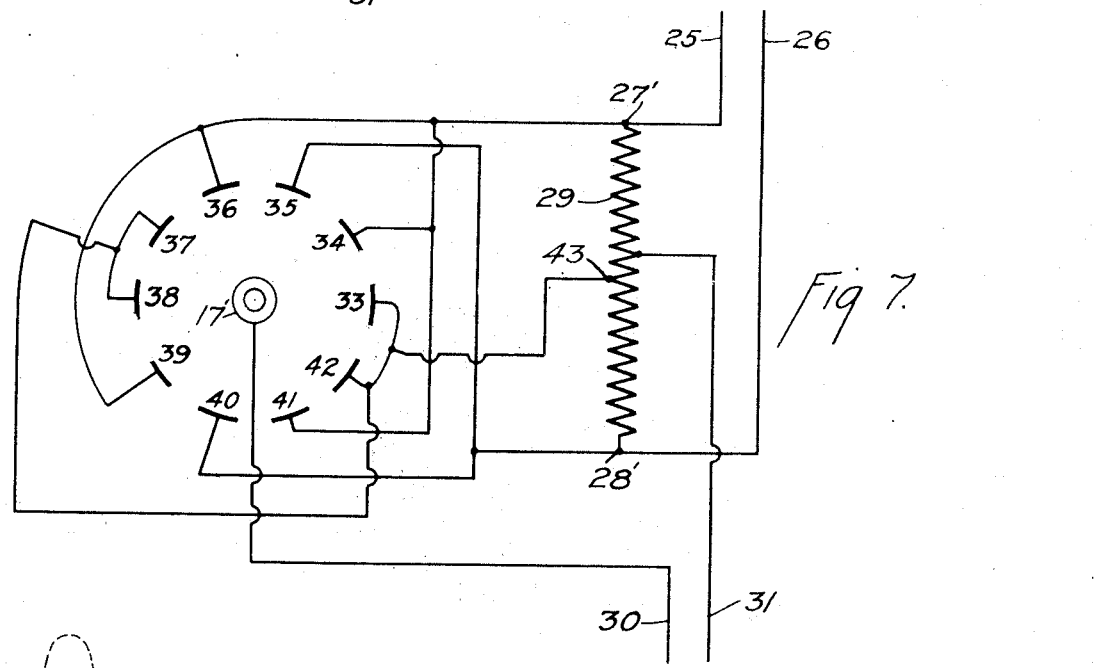
Figure 5:
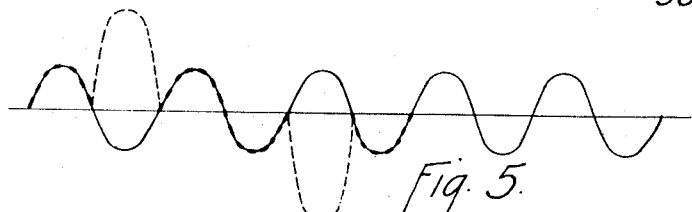
Figure 6:
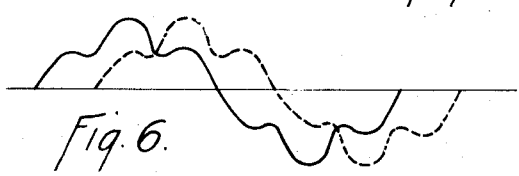

In the drawings: Figure 1 is a diagrammatic illustration of a means in accordance with my invention for transforming alternating current of one frequency to alternating current of a different frequency. Fig. 2 is a wiring diagram showing the connections employed in Fig. 1. Figs. 3 and 4 are diagrammatic illustrations of the circuit employed in connection with my invention and illustrate the direction of flow of current at different periods during the cycle of operation of the apparatus. Fig. 5 is a diagrammatic curve illustrating the alternating current received from the supply main in full lines and the transformed voltage curve in dotted lines. Fig. 6 is a similar curve illustrating the character of the current delivered to the utilization circuit by the converting apparatus. Fig. 7 is a modified arrangement of apparatus embodying my invention.

The current converting apparatus is shown as comprising a mercury well 15 which contains a predetermined amount of mercury 16, a revolving impeller pump 17 which draws a stream of mercury from the well and discharges it successively on to terminal blocks or sectors 18, 19, 20, 21, 22, and 23, and a synchronous motor 24 which drives the impeller 17 and which receives actuating current from the mains 25 and 26 of the alternating current distribution system.

In Figs. 1 and 2 I have disclosed an embodiment of the invention for converting alternating current of one frequency into alternating current of a lower frequency. In the apparatus illustrated the sectors are so located that they may be considered as arranged in two sets, one including the sectors 18, 19 and 20, and the other including the sectors 21, 22 and 23. The sectors are also so connected to the supply main, the utilization circuit and a transformer 29 that as the mercury stream issuing from the impeller 17 successively electrically connects the sectors of one set with the impeller, and through it with one lead of the utilization circuit, the relatively high frequency current received from the supply mains is delivered to the utilization circuit in one direction and then is reversed in its direction of flow as the mercury brush coöperates with the other set of sectors. In this way low frequency alternating current is delivered to the utilization circuit. The apparatus illustrated in Figs. 1 and 2 is adapted to transform six alternations or current waves received from the supply mains into two alternations or current waves in the utilization circuit; or in other words, is adapted to effect a transformation corresponding to the conversion of A. C. of sixty cycles into A. C. of 20 cycles. The synchronous motor 24 is so connected to the impeller 17 that the mercury brush issuing from it moves from one sector to the next adjacent sector for each reversal in current of the supply main and the transfer of the brush from one sector to the next takes place at zero voltage. With this arrangement of apparatus, viz., the arrangement disclosed in Figs. 1 and 2, two out of every three current waves of the supply main are delivered to the utilization circuit without being reversed, whereas the third or intermediate wave is reversed in the direction of its flow in being delivered to the utilization circuit. The relatively high frequency leads 25 and 26 are connected to the terminals 27 and 28 of the auto-transformer 29. Leads 30 and 31 of the low frequency alternating current system are respectively connected to the mercury 16 in the well 15 and a terminal in the auto-transformer. The high frequency main 25 is shown connected to one terminal 27 of the transformer, and the high frequency main 26 is shown connected to the other terminal 28 of the transformer. The middle block 19 in one set, and 22 in the other set are shown connected to a point on the transformer of higher voltage than the blocks 18, 20, 21, and 23, with relation to the point of connection of the lead 31, as the current flowing through them constitutes the middle point of the low frequency waves.

It is obvious that any number of blocks may be employed to constitute one low frequency wave; the greater the number of blocks the lower the resulting frequency. In Fig. 7, I have illustrated an arrangement of apparatus which may be employed in converting current of 60 cycles to current of 12 cycles. In this apparatus the sectors 33, 34, 35, 36 and 37 may be considered as constituting one set, while the sectors 38, 39, 40, 41 and 42 constitute the other set. The impeller 17' is adapted to deliver a mercury brush which successively contacts with the different sectors and which, like the impeller 17 of Fig. 2, is directly connected through the mercury well with the lead 30 of the utilization circuit. The end terminals 33 and 37 of one set, and 38 and 42 of the other set are shown connected to the transformer 29 at a point 43. The sectors 34 and 36 of one set, and the corresponding sectors 39 and 41 of the other set are shown connected to a point 27' in the transformer, a greater number of coils distant from the point of connection of the lead 31 than the point 43. The middle sectors 35 and 40 of each of the sets are connected to the transformer 29 at a point 28' a greater number of coils distant from the point of connection of the lead 31 than the point 27'. It is also obvious that more than two sets of blocks can be used with a synchronous motor of the proper speed.

The operation of the apparatus illustrated in Figs. 1 and 2 is as follows: When the mercury brush issuing from the impeller electrically connects the lead 30 with the sector 22 the flow of current through the apparatus and the circuits forming a part of it is as illustrated by the arrows in Fig. 3, it being considered that the alternating lead 26 is receiving a current wave from the main source of supply, whereas the lead 25 is transmitting the return wave. Upon a reversal in the main supply the mercury brush passes from the sector 22 to the sector 23 and the flow of current through the connecting circuits is then as illustrated by the arrows in Fig. 4. Upon the next reversal of current the brush moves to the sector 18 and the current flow through the operating circuits is directly opposite to the flow indicated by the arrows in Fig. 4. As the brush moves to the sector 19, the current in the supply mains is again reversed and the flow through the connecting circuits is directly opposite to the flow indicated by the arrows in Fig. 3. From this it will be seen that the mercury brush moves from one sector to the next for each reversal of current in the main supply circuit and that the intermediate wave of each three adjacent waves is reversed in its flow in being delivered to the utilization circuit, whereas the other two waves are delivered to the utilization circuit without being reversed. In addition to this it will be noted that the intermediate wave which in each case is delivered through one or the other of the sectors 19 and 22 is of higher voltage than the end waves, since a larger number of coils of the transformer 29 are intervened between the terminals 30 and 31 than is the case when the mercury brush is on sectors 23 or 18.

In Fig. 5, the full line curve illustrates the voltage curve of the main supply current, whereas the dotted line curve diagrammatically illustrates the voltage curve of the voltage delivered to the utilization circuit. Owing to the fact that circuits contain more or less inductance, the sharp valleys of the voltage curve will be rounded off and the current curve of the utilization circuit will approximate the curve illustrated in Fig. 6.

From the above it will be apparent that it is necessary to employ separate sectors, since the sector 19 of one set must intervene between the sectors 18 and 20 of that set. It will be apparent that in the apparatus illustrated the sectors 20 and 21 could be replaced by a single sector and that the sectors 18 and 23 could also be replaced by a single sector, but it is desirable to employ sectors as illustrated, since it enables obvious switching operations which would be necessary in case the frequency of the current delivered to the utilization is to be varied.

In Fig. 6 the dotted line curve illustrates the current wave which could be furnished to a utilization circuit by an additional apparatus identical to that illustrated in Fig. 1 but set out of phase with it. It will be obvious from this that polyphase current may be readily delivered to utilization circuits by suitable duplication of the apparatus illustrated in either Fig. 1 or 7.

Having thus described my invention, what I claim is:

1. A current transformer, comprising a movable terminal, a plurality of stationary sectors adapted to be periodically and successively placed in electrical connection with the movable terminal, said sectors being located in sets, and means for impressing different voltages on different sectors of a set so arranged that the voltage impressed on the center sector of each set is higher than the voltage at the end sectors.

2. In a current transformer, a moving terminal, sets of stationary sectors adapted to be successively electrically connected to the moving terminal, alternate sectors in each set being, at any instant, of opposite polarity to the other sectors of the set, each end sector of each set being at any instant of the same polarity as the end sector nearest to it of the adjacent set.

3. A current transformer comprising a movable terminal, a plurality of sets of stationary sectors adapted to be successively connected to the moving terminal, means for impressing various voltages on the sectors so arranged that said sectors increase in voltage from the ends of each set toward the center.

4. A current transformer comprising a movable terminal, a plurality of sets of stationary sectors adapted to be successively electrically connected with the moving terminal, means for impressing various voltages on the different sectors so that the voltage of the middle sector of each set is higher than the voltage of the end sectors, and synchronous means for moving said movable terminal.

5. In combination with a source of alternating current, a utilization circuit, means interposed between said source and said utilization circuit for reducing the frequency of the current delivered to the utilization circuit, comprising a movable terminal, a plurality of stationary sectors adapted to be successively electrically connected with the movable terminal, and means for causing the instantaneous current and voltage values in the utilization circuit to approximate a sine curve.

6. In combination with a source of alternating current, a utilization circuit, means interposed between said source and said circuit for delivering from the source to the circuit alternating current of lower frequency than that emanating from the source, comprising a movable terminal, a plurality of stationary sectors located in sets and adapted to be successively electrically connected with the movable terminal, means for impressing a lower voltage on the end sectors of each set and means for shifting the electrical connection between the movable terminal and the sectors in synchronism with reversals in the current from the source.

7. In combination with a supply circuit of alternating current, a utilization circuit, and means interposed between said circuits for delivering from the supply to the utilization circuit alternating current of lower frequency than that of the supply circuit, comprising a movable terminal electrically connected to a lead of the utilization circuit, a transformer having an intermediate terminal electrically connected to the other lead of the utilization circuit, stationary sectors located in sets and adapted to be successively electrically connected with the movable terminal, end sectors of all the sets being connected to the same terminal of the transformer and intermediate sectors of the sets being connected to a terminal of the transformer a greater number of turns distant from the point of connection with the terminal of the utilization circuit than the end sectors, the leads from the supply circuit being connected to end terminals of the transformer, and means for moving said movable terminal in synchronism with the reversals in current in the supply circuit.

In testimony whereof, I have hereunto subscribed my name this 26 day of May, 1913.

ALEXANDER T. KASLEY.

Witnesses:
C. W. McGHEE,
ANNA CLOHERTY.